April 12, 1966 G. J. VOGEL 3,246,327
MULTIPLE OBJECT DETECTING RADAR SYSTEM USING PHASED ARRAY
Filed April 17, 1963
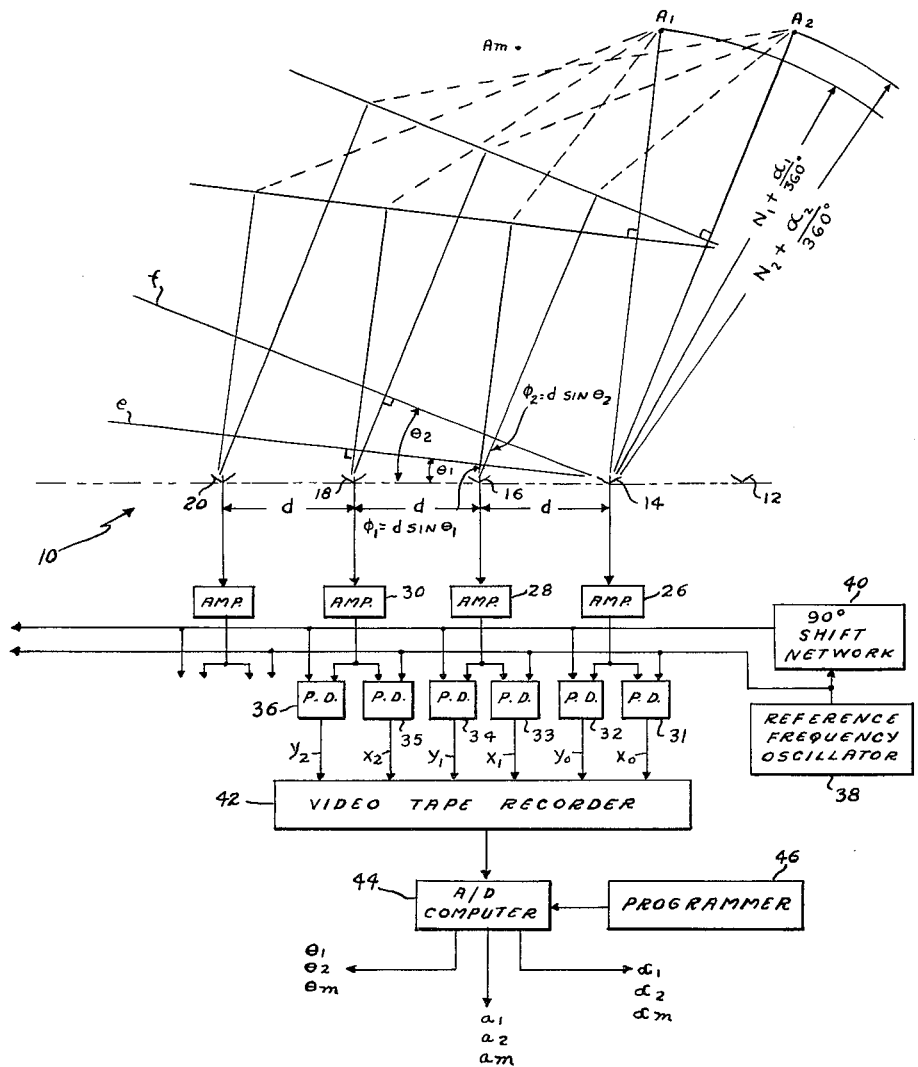
INVENTOR.
GEORGE J. VOGEL
BY
ATTORNEY

United States Patent Office 3,246,327
Patented Apr. 12, 1966

3,246,327
MULTIPLE OBJECT DETECTING RADAR SYSTEM
USING PHASED ARRAY
George J. Vogel, Rome, N.Y., assignor to the United
States of America as represented by the Secretary of
the Air Force
Filed Apr. 17, 1963, Ser. No. 273,796
5 Claims. (Cl. 343—16)

The invention described herein may be manufactured and used by or for the United States Government for governmental purposes without payment to me of any royalty thereon.

This case relates to radar systems in general and, particularly, to a radar system using a phased array for angular resolution enhancement where requirements for detecting multiple targets, objects, or the like exist.

Angular or azimuth resolution is the angle or distance which two targets must be separated in azimuth to be distinguished by a radar beam, when the targets are at the same range. Angular resolution definition is usually in terms of the half-power of the radiation lobe or, as otherwise expressed, in terms of the 3 db points. For two targets at substantially the same distance from a ground reference point and located, one and the other, at the half-power points of a radiation lobe, the beam is unable to distinguish between the two targets and thus gives a single target presentation. In such a case the instantaneous azimuth indication lies substantially at the center of the echo area defined by the mass of the targets. Away from the half-power points, and outside the radiation lobe, the resolution of multiple targets into an azimuth to each target ordinarily poses no special problem. In mechanical radar systems, such as the type which employ a horn on which incident energy from a larger reflector is focused, the use of half-power points to determine angular resolution is a commonly accepted technique. In a phased array, however, information additional to that available from a single-reflector system may be produced from the same wavefront, assuming the presence of multiple targets. This information is the relative phase and amplitude of the signal on each element of the array. Such information is, of course, necessarily different at each element so that the distribution of reflected energy across the array is instantaneously dependent on the arrangement of target positions and is constantly changing.

An object of the invention, therefore, is to provide a multiple object detecting-system whose angular resolution is a considerable improvement over systems presently in use, regardless of the relative target size provided, only that each target may independently of the others return an echo pulse discernible above the inherent noise threshold.

The features, other objects, and advantages of the invention will become more apparent from the following detailed description of one embodiment of the invention when read in connection with the accompanying single figure which is a schematic diagram of the invention, primarily in block diagram form, including a geometric representation for illustrating the physical principles upon which the present invention for improving angular resolution is based.

Referring now to the drawing, the upper section thereof geometrically simulates an actual condition of wave reflection from different targets. The reference character 10 designates a phased array of antenna elements 12, 14, 16, 18 and 20 spaced preferably equidistantly from each other by a baseline distance designated $d$. Hereinafter, for purposes of illustration, element 14 is defined as the center element of the array, it being understood that other elements such as the element 12 may be located symmetrically on the other side of the center element, in the usual manner of phased arrays. In setting forth the principles of the invention, only two targets or sources of signals will be considered although, as will be seen below, the number of detectable targets is not fixed but is limited only by the capacity of the system for solving equations defining the parameters involving each target. Let it be assumed that echo reflections in the form of wavefronts $e$ and $f$ are returned toward the baseline from two point sources $A_1$ and $A_2$ which may be considered targets. A third possible target $A_m$ completes the illustration. Assuming all $\alpha$ quantities to be in electrical degrees, the two-way distance in wavelengths, commonly expressed by $\lambda$, from target $A_1$ to element 14 is $$N_1+\alpha_1/360° \tag{1}$$

and the two-way distance between target $A_2$ and element 14 is $$N_2+\alpha_2/360° \tag{2}$$

$N_1$ and $N_2$ are integers which are unequal for different target ranges representing the number of complete wavelengths in the carrier frequency in the total distance involved. The factor $\alpha_1/360°$ is that part of a wavelength in addition to the $N_1$ number of wavelengths to target $A_1$ and back. By similar analysis, $\alpha_2/360°$ is the fractional part of a wavelength in addition to the $N_2$ number of wavelengths to a target $A_2$ and back. In a manner to be brought out below, $\alpha_1$ is determined as the phase difference between an echo signal from target $A_1$ and an internally-generated reference signal to be described, and $\alpha_2$ is similarly obtained by phase comparison of the reference signal and echo signals from target $A_2$.

Let it be assumed that the distance $d$ is significantly less than the distance between the targets and earth so that $\theta_1$ and $\theta_2$ are angles between the baseline and wavefronts $e$ and $f$, respectively. Hence, $$\phi_1=d \sin \theta_1 \tag{3}$$

and, $$\phi_2=d \sin \theta_2 \tag{4}$$

where $\phi_1$ and $\phi_2$ represent the phase gradient of targets $A_2$ and $A_2$ are directly related to the positions of the targets. It will thus be apparent that the distance separating each of the elements to the left of element 14 from any of the targets is directly a function of the positions of these elements relative to element 14. As an illustration, the quantity $N_1+\alpha_1+n\Phi_1/360°$ represents the distance from target $A_1$ to any of the elements in the array, plus the distance from target $A_1$, to element 14 where $n$ indicate $nth$ element relative to the midpoint element 14. The same reasoning applies to target $A_2$ so that it may be seen that distance between target $A_2$ and element 18 may be expressed as $$N_2+\alpha_2+2\Phi_2/360° \tag{5}$$

or, as alternately stated, $$N^2+\alpha_2+2(d \sin \theta_2/360° \tag{6}$$

Carrying further the discussion of physical principles explaining the invention, it will be observed that the composite signal present on each element is the vector sum of several signals arriving from different targets along directions related to the instantaneous position of the targets. As stated earlier, the system of the invention determines azimuth data for each of multiple targets located within the radar beam width. It is therefore possible, with reference to the drawing, to write the equations of the vector sums in terms of the incident signals. As originally specified, elements 14, 16, 18 and 20 are arranged in a linear array with a distance $d$ separating adjacent elements. Suitable amplifiers 26, 28 and 30 may be employed to improve the signal-to-noise ratio. Phase detectors 31 through 36 receive the output of the amplifiers. Specifically, the phase detectors are paired, that is, a common input terminal of phase detectors 31 and 32 is connected to the output of amplifier 26 while the paired phase detectors 33, 34 and 35, 36 have common input terminals connected, respectively, to the outputs of amplifiers 28 and 30. Each of phase detectors 31, 33 and 35 receives at its other input terminal a second input from a reference frequency oscillator 38 whereas a second input to the other three phase detectors 32, 34 and 36 is produced by a 90° phase shift network 40 connected to receive the reference oscillations. As a requirement for operation, oscillator 38 must have the same frequency and phase characteristics as the transmitted carrier, as, for example, in the manner of coherent radar systems. Or, the oscillator selected may serve simultaneously as the transmitter oscillator. Each phase detector operates in the ordinary manner to produce an output which is proportional to the relative phase difference between the two signals fed into it. In the case shown, each phase detector will produce a signal which is a measure of the phase difference between the one input signal from the associated amplifier and the reference oscillations or the phase-shifted reference oscillations, as the case may be. The phase shift introduced by network 40 permits expression of the vector sums in terms of orthogonal sine and cosine components.

The equations which describe the output signals of phase detectors 31 through 36 in terms of the sine components of the two wavefronts $e$ and $f$ may be written as:

$$y_0 = a_1 \sin \alpha_1 + a_2 \sin \alpha_2 + a_m \sin \alpha_m \quad (7)$$

$$y_1 = a_1 \sin (\alpha_1 + \phi_1) + a_2 \sin (\alpha_2 + \phi_2) + a_m \sin (\alpha_m + \phi_m) \quad (8)$$

$$y_2 = a_1 \sin (\alpha_1 + 2\phi_1) + a_2 \sin (\alpha_2 + 2\phi_2) + a_m \sin (\alpha_m + 2\phi_m) \quad (9)$$

$$y_n = a_1 \sin (\alpha_1 + n\phi_1) + a_2 \sin (\alpha_2 + n\phi_2) + a_m \sin (\alpha_m + n\phi_m) \quad (10)$$

Similarly, in terms of the cosine components, $$x_0 = a_1 \cos \alpha_1 + a_2 \cos \alpha_2 + a_m \cos \alpha_m \quad (11)$$

$$x_1 = a_1 \cos (\alpha_1 + \phi_1) + a_2 \cos (\alpha_2 + \phi_2) + a_m \cos (\alpha_m + \phi_m) \quad (12)$$

$$x_2 = a_1 \cos (\alpha_1 + 2\phi_1) + a_2 \cos (\alpha_2 + 2\phi_2) + a_m \cos (\alpha_m + 2\phi_m) \quad (13)$$

$$x_n = a_1 \cos (\alpha_1 + n\phi_1) + a_2 \cos (\alpha_2 + n\phi_2) + a_m \cos (\alpha_m + n\phi_m) \quad (14)$$

In the above equations $n$ refers to the number of elements in the array while $m$ is the number of targets. The value $m$ will always be much less than $n$. The amplitudes of the signals from targets $A_1$, $A_2$, $A_m$, at any element, are given by $a_1$, $a_2$, $a_m$, respectively. The factors $N_1$ and $N_2$ do not appear in the equations since, as one example taken in accordance with the trigonometric identity of the sine of the sum of two angles $$\sin (360° N_1 + \alpha_1 + \phi_1) \equiv \sin (\alpha_1 + \phi_1)$$

and $$\cos (360° N_1 + \alpha_1 + \phi_1) \equiv \cos (\alpha_1 + \phi_1)$$

Certain similarities between the equations may readily be noted. Common to all of the vector sums is the representative angle $\alpha_m + n\phi_m$, $n\phi_m$ being zero for the $x_0$ and $y_0$ terms, which gives the phase difference at the $n$th element between the signal from a target $m$ and the reference signal of oscillator 38. Also, the vector sum defined by each $y$-term contains the same angular quantity in each of its variables as appears in corresponding variables in the vector sum of the corresponding $x$-term. From the equations it may be seen that there are three unknowns per target, i.e., $a$, $\alpha$ and $\phi$. Having assumed two targets in the space penetrated by the radar beam three independent equations per target must be available for a proper solution. The necessary equations for obtaining angular resolution not limited by the half-power beam width are those given by the $y_0$, $y_1$, $y_2$, $x_0$, $x_1$ and $x_2$ terms.

A storage device 42 having manifold inputs connected to the phase detectors 31 through 36 and a single output records the $x$- and $y$-term signals in a manner proper for sequential readout to an analog-to-digital computer 44 programmed by a programmer 46, in the manner of computer systems. Computer 44 is capable of solving at least six simultaneous equations and accomplishes the mathematical interpretations of these signals in accordance with the equations prescribed above. The computer output of the $a$ and $\alpha$ parameters will be developed directly and may be used to actuate suitable indicators. As to the $\phi$ parameters, the computer may be suitably programmed to deliver actual values of the $\phi_1$, $\phi_2$, $\phi_m$ outputs or, by relying on the relationship prescribed above between the parameters $\theta_1$, $\phi_2$, $\phi_m$, $d$, and the angles $\theta_1$, $\theta_2$, $\theta_m$, the mathematical interpretation accomplished by computer 44 may instead be made to yield values defining the $\theta_1$, $\theta_2$, $\theta_m$ angles, thereby relating these computer outputs directly to the bearings of the targets. The latter case is illustrated in the drawing in the form of $\theta_1$, $\theta_2$, $\theta_m$ outputs whereby immediate angular resolution by path computations and predictions may be accomplished. It will be obvious that target size evaluation is possible by utilizing the $a_1$, $a_2$, $a_m$ information while, through correlation techniques, the $\alpha_1$, $\alpha_2$, $\alpha_m$ parameters may be applied for range resolution.

A multi-object phased-array detecting system of the type outlined has certain advantages which will prove useful. A simple application would be to determine if either multiple targets or a single antenna are represented in an echo signal and, if only one target has been intercepted, to pinpoint its location within the radar beam. After the preliminary determination, repetitious solutions for later positions of the same target become easier. Also, the test for multiple targets is not necessary for every observation made. Other advantageous uses to which the invention may be put are target detection during the presence of accompanying decoys or clutter, such as tinfoil, for the purpose of controlling the flight of a defensive weapon along a bearing influenced by the position of the target notwithstanding their location in the same beam.

Although only one embodiment of the invention has been illustrated and described, it will be apparent to those skilled in the art that various changes and modifications may be made without departing from the spirit of the invention or the scope of the appended claims.

I claim:
1. A multiple-target detecting system comprising:
three antennas arranged linearly with equidistant spacing therebetween for receiving wavefronts from said targets in such manner that currents induced in said antennas from each target differ in phase relationship;
two phase detectors so associated with each antenna that induced-current proportional signals are fed to one input terminal of the pair of phase detectors associated with that antenna;
means for feeding the other input terminal of only one of the phase detectors in each pair with reference oscillations referenced in phase and frequency to the transmitted energy illuminating said targets;
phase-shifting means receiving said reference oscillations for feeding the other input terminal of the other phase detector in each pair with oscillations shifted in phase by 90 degrees relative to said reference oscillations;
and computer means receiving the outputs of said phase detections for determining phase gradient quantities at each of said antennas.

2. A system for producing target information from earth-bound radiation wavefronts returned from multiple targets illuminated by transmitted energy comprising:

at least three antennas arranged side-by-side in such manner that currents induced in said antennas by said wavefronts differ in phase relationship;

a plurality of phase detectors each producing an output voltage which is a function of the phase differences of two signals fed to its input terminals;

said phase detectors being arranged in groups of two with the phase detectors in each group both having one input terminal connected to receive the output from one of said antennas;

a source of oscillations referenced to said transmitted energy in phase and frequency having an output terminal connected to the other input terminal of only one of the phase detectors in each group;

phase-shifting means receiving said reference oscillations for energizing the other input terminal of the other of said phase detectors in each group with a wave shifted in phase of 90 degrees with respect to said reference oscillations;

storage means simultaneously responsive to the outputs of all of said phase detectors for storing the phase-difference products, and computer means programmed to produce from said phase-difference products signals peculiar to the size and bearing of each target relative to the ground location.

3. The system of claim 1 wherein amplifying means for separately amplifying the currents in each of said antennas are connected in advance of said phase detectors.

4. A system for producing target information from earth-bound radiation wavefronts re-radiated from multiple targets comprising:

at least three antennas spaced from each other a predetermined distance and being so responsive to said wavefronts that currents of different phase relationship are induced in said antennas, a plurality of phase detectors each providing across its output terminals a voltage whose magnitude is a function of the phase differences of two voltages fed to the input terminals thereof;

said phase detectors being arranged in groups of two with the phase detectors in each group both having one input terminal connected to receive the output from one of said antennas;

a source of reference oscillations referenced to said transmitted energy in phase and frequency;

said source having its output coupled to the other input terminal of only one of said phase detectors in each group whereby said one phase detector produces an output proportional to the phase difference between said reference oscillations and the input wave to said phase detector due to said induced currents;

a phase shifting device responsive to said reference oscillations having an output differing in phase by 90 degrees compared to said reference oscillations;

said device having the output thereof coupled to the other input terminal of the other of said phase detectors in each group whereby said other phase detectors produce an output proportional to the phase differences between said phase-shifted oscillations and the input wave to said other phase detectors due to said induced currents;

and computer means receiving said outputs from all of said phase detectors for producing signals resolving the positions of said multiple targets within the nominal beam-width of said transmitted energy.

5. A system for producing target information from earth-bound radiation wavefronts re-radiated from multiple targets caught in the same beam of transmitted energy comprising:

three antennas arranged in a straight line and spaced from each other by a predetermined distance;

means for separately amplifying currents induced in said antennas in such manner that for wavefronts travelling unequal distances from a target to two antennas the currents in said antennas will be out of phase with each other;

a plurality of phase detectors each providing across its output terminals a voltage whose magnitude is a function of the phase differences of two voltages fed to the input terminals thereof;

said phase detectors being arranged in groups of two with the phase detectors in each group both having one input terminal fed by the output of one of said amplifying means;

a source of reference oscillations referenced to the frequency and phase of said transmitted energy, means for shifting the phase of said reference oscillations by 90 degrees;

said reference oscillations being coupled to the other input terminal of only one of the phase detectors in each group whereby said reference oscillations are phase-compared with said amplified currents;

said phase-shifted oscillations being coupled to the other input terminal of the other of said phase detectors in each group whereby said phase-shifted oscillations are phase-compared with said amplified currents;

means for storing the phase comparison signals from all of said phase detectors;

computer means responsive to said stored signals for producing phase-gradient proportionsl signals which are dependent on the directions of said targets relative to said antennas;

and means for programming said computer means.

No references cited.

CHESTER L. JUSTUS, *Primary Examiner.*

R. E. KLEIN, P. M. HINDERSTEIN,
　　　　　　　　　　　　　　　*Assistant Examiners.*